United States Patent
Lyyra et al.

(10) Patent No.: US 7,695,625 B2
(45) Date of Patent: *Apr. 13, 2010

(54) METHOD AND APPARATUS FOR PURIFICATION OF SLIGHTLY WATER-SOLUBLE ORGANIC SOLUTION FROM AQUEOUS ENTRAINMENT

(75) Inventors: Juhani Lyyra, Espoo (FI); Pertti Pekkala, Espoo (FI); Raimo Kuusisto, Espoo (FI); Eero Ekman, Pori (FI); Bror Nyman, Ulvila (FI)

(73) Assignee: OutoTec Oyj, Espoo (FI)

( * ) Notice: Subject to any disclaimer, the term of this patent is extended or adjusted under 35 U.S.C. 154(b) by 595 days.

This patent is subject to a terminal disclaimer.

(21) Appl. No.: 11/628,856

(22) PCT Filed: Jun. 9, 2005

(86) PCT No.: PCT/FI2005/000270

§ 371 (c)(1),
(2), (4) Date: Dec. 8, 2006

(87) PCT Pub. No.: WO2005/120677

PCT Pub. Date: Dec. 22, 2005

(65) Prior Publication Data

US 2007/0246418 A1    Oct. 25, 2007

(30) Foreign Application Priority Data

Jun. 10, 2004    (FI)    ................................ 20040800

(51) Int. Cl.
*B01D 11/00*    (2006.01)
*B01D 21/02*    (2006.01)
*B01D 11/04*    (2006.01)

(52) U.S. Cl. ....................... 210/634; 210/802; 210/511; 210/521; 210/522; 210/540; 422/256

(58) Field of Classification Search ................. 210/634, 210/702, 801, 519, 511, 522, 799, 800–804, 210/DIG. 5, 538, 540; 422/256–259
See application file for complete search history.

(56) References Cited

U.S. PATENT DOCUMENTS 2,681,269 A * 6/1954 Bergstrom .................. 422/257
3,894,943 A   7/1975 Hartmann et al.
4,507,268 A * 3/1985 Kordosky et al. ............. 423/24

(Continued)

FOREIGN PATENT DOCUMENTS

WO    WO 03/097205 A1    11/2003

(Continued)

*Primary Examiner*—Krishnan S Menon
*Assistant Examiner*—Katherine Zalasky
(74) *Attorney, Agent, or Firm*—Buchanan Ingersoll & Rooney PC

(57) ABSTRACT

The invention relates to a method and apparatus with which an organic solution that is slightly soluble in water is scrubbed of aqueous entrainment and impurities. In particular, the organic solution may be the organic extraction solution of liquid-liquid extraction used in connection with the hydrometallurgical recovery of metals. The purpose is to perform the physical separation of water droplets and the chemical removal of impurities from the organic solution simultaneously. This occurs by routing the solution to be purified in the settling tank through at least one flow plate cassette of reduced cross-section.

26 Claims, 4 Drawing Sheets

U.S. PATENT DOCUMENTS

Figure 1:
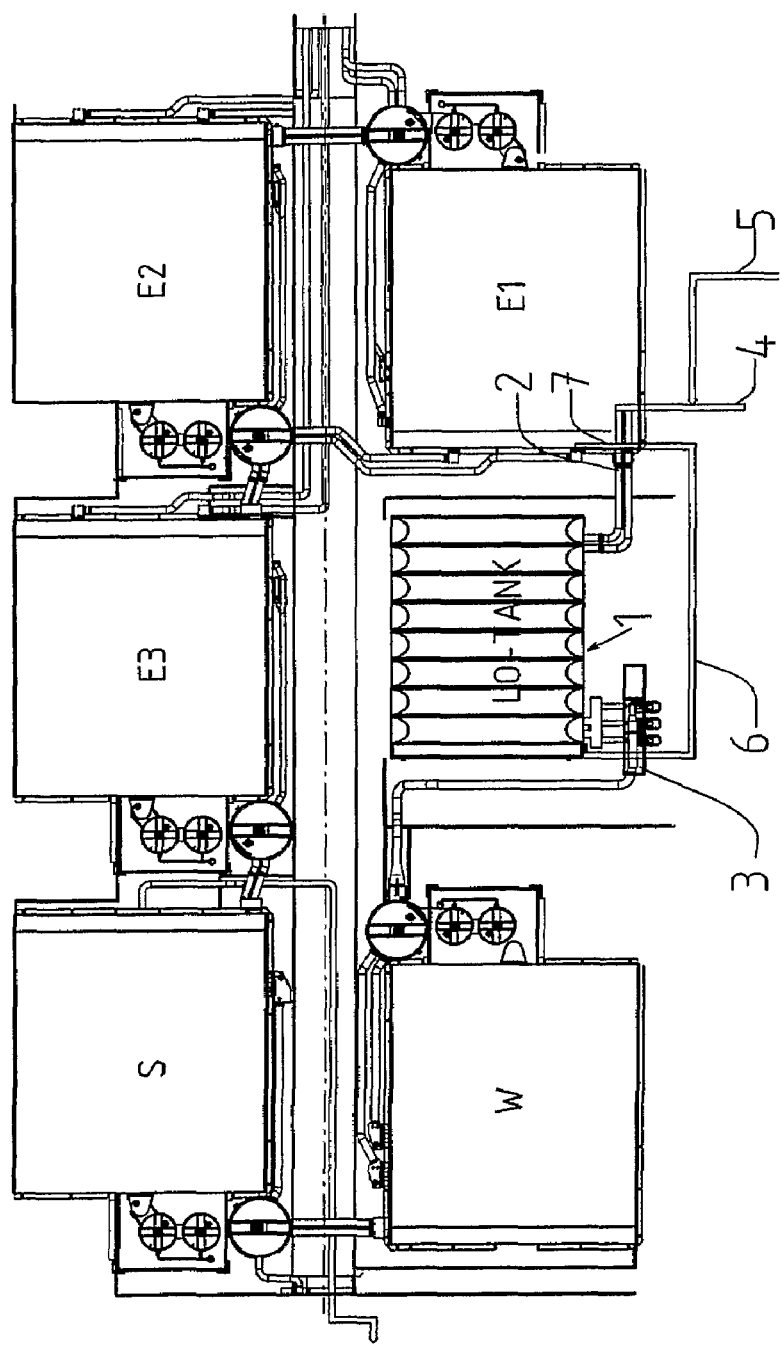

| | | | | |
|---|---|---|---|---|
| 5,474,688 A | * | 12/1995 | Hedrick et al. | 210/802 |
| 5,527,461 A | | 6/1996 | Hill | |
| 5,656,173 A | * | 8/1997 | Jordan et al. | 210/703 |
| 6,083,400 A | * | 7/2000 | Nyman et al. | 210/634 |
| 6,132,615 A | | 10/2000 | Nyman et al. | |
| 6,171,465 B1 | * | 1/2001 | Compton | 204/570 |
| 6,423,238 B2 | | 7/2002 | Hernandez | |
| 6,432,370 B1 | * | 8/2002 | Nyman et al. | 422/256 |
| 2007/0210000 A1 | | 9/2007 | Pekkala et al. | |

FOREIGN PATENT DOCUMENTS

WO  WO 2004/108245 A1  12/2004

* cited by examiner

US 7,695,625 B2

METHOD AND APPARATUS FOR PURIFICATION OF SLIGHTLY WATER-SOLUBLE ORGANIC SOLUTION FROM AQUEOUS ENTRAINMENT

FIELD OF THE INVENTION

The invention relates to a method and apparatus for purifying an organic solution that is slightly soluble in aqueous solutions of aqueous entrainment and impurities. The organic solutions are the organic extraction solution of liquid-liquid extraction used in connection with the hydrometallurgical production of metals.

BACKGROUND OF THE INVENTION

The hydrometallurgical recovery of metals often comprises the following stages: the leaching of a concentrate or ore, liquid-liquid extraction and the precipitation or reduction of the metal. Leaching may be bioleaching or dilute acid leaching, from which the aqueous solution is routed to liquid-liquid extraction. In liquid-liquid extraction, an organic reagent solution is mixed in an extraction cell (mixer-settler) or in a column, into an aqueous solution that contains the substance to be purified and concentrated as soluble, metal usually in the ion form or as a complex along with several impurities. The valuable metal or substance to be refined reacts selectively with the organic extraction chemical, whereby it is made to separate from the aqueous solution into the extraction chemical in pure form. The valuable metal or substance can then be separated from the organic solution back into an aqueous solution (stripping) with the inverted chemical reaction to extraction, and can then be recovered again from there as a product, for instance by precipitation or reduction to metal. Reduction is usually electrolysis, to which the stripping aqueous solution is routed as the electrolyte. When the valuable metal is recovered from the electrolyte, this acidic aqueous solution is routed back to stripping.

The extraction process is thus the mixing together of liquids that are physically insoluble in each other into droplets or a dispersion in the mixing section of the extraction apparatus, and after chemical mass transfer, the droplets in the dispersion are made to coalesce back into the original layers of liquid in the settling section or settler. Intensive mixing or a significant change in the surface chemistry conditions of the process may result in very small droplets, which require a lot of time to disengage to their own liquid phase. These droplets do not necessarily have time to disengage in the actual settling section of the extraction step, but move further along the process with the other phase. The entrainment of the original feed solution (aqueous solution) with the organic solution to later process steps may reduce the purity of the final product and require additional purification measures. This of course increases process costs. In the same way organic extractant may get lost together with the treated aqueous solution. In both cases the cost-effectiveness of the process is reduced.

In the copper extraction process, impurities may be transferred via stripping to the copper electrolyte, endangering the quality of the copper cathodes in the subsequent electrolysis. It is also quite expensive to discard part of the sulphuric acid-containing electrolyte continually, which is for the time being the general practice for reducing impurity levels.

In particular, a tank has been used for the removal of aqueous entrainment from the organic solution situated after the extraction cells, in which the residual droplets of water fall towards the bottom of the tank by the effect of gravity and the purified surface layer of the solution can be routed to the following process stage, known as a after-settler. The tank may function simultaneously as a equalising tank, which is required to even out changes in the volume of organic solution that occur in the various parts of the process. In this case the surface level of the solution in the tank varies.

The actual purification step of the organic solution, scrubbing, takes place using mixer-settler cells, in which basically chemically-bound impure substances are removed by treating the organic solution with a suitable aqueous solution. In this case therefore a dispersion of extraction solution and aqueous solutions, similar in function to an extraction cell, is formed so as to obtain a large liquid-liquid surface area. Besides chemical scrubbing, water droplets are also removed or the impurities contained in them are diluted. A mixer-settler cell built for scrubbing purposes generally consists of a pump, a mixer and a settling tank with its retaining fences and is generally the size of an extraction cell. Changes in organic solution volume cannot be evened out with a scrubbing cell, so a separate equalising tank as mentioned above is needed, with the required volume capacity.

The scrubbing of the extraction solution described above has been adopted in extraction solutions in order to dilute the water droplets that are entrained in them. In general, the scrubbing solution contains sulphuric acid and, in the case of copper extraction, copper too, so that impurities such as iron bound to the extraction solution via chemical reactions may be displaced by this means. Even after the mixer-settler of the scrubbing stage the extraction solution may still contain some residual droplets of water, and their removal also prevents to some extent the transfer of impurities to the following process stage.

PURPOSE OF THE INVENTION

The purpose of the method and equipment of the invention is to purify an organic solution that is slightly water-soluble from aqueous entrainment and impurities simultaneously in a simple and effective manner. Organic solution herein means the organic extraction solution of liquid-liquid extraction used in connection with the hydrometallurgical production of metals.

SUMMARY OF THE INVENTION

The characteristic features of the invention will be made apparent in the attached claims.

In the method according to the invention an organic extraction solution is treated said solution exiting liquid-liquid extraction that occurs during a hydrometallurgical recovery of valuable metals and valuable substances and which contains the valuable metal or substance separated from the aqueous solution. The organic solution to be purified is scrubbed with an acidic aqueous solution. The aqueous solution may be fed into the organic solution either before the solution is routed to the settling tank and/or fed into the organic solution in the front end of the tank.

The organic solution is made to discharge evenly into the feed end of the settling tank in several separate sub-streams across the entire width of the tank, whereby the solution streams are separated from each other at the same time.

The extraction solution is made to flow through a flow channel area with a reduced cross-section that extends over the width of the tank at least at one point. The flow channels are located in the upper section of the droplet coalescer according to the invention, with the lower section of the device being mainly solid. In the droplet coalescer zone the aqueous solution is made to flow through the flow channels, which have a cross-sectional area of 10-25% of the total cross-sectional area of the solution depth, i.e. the tank area from the bottom to the liquid level.

Flow channels are grouped so as to be overlapping and inclined obliquely upwards in the direction of flow. The depth of the flow channels is in the region of 2-6 mm, preferably 3-5 mm. The majority of the solution flow is laminar, but the lower part of the flow channel is suitable for forming a swirl, which makes the droplets of aqueous solution collide with each other and thus form larger droplets. The surfaces of the flow channels are roughened and/or otherwise shaped to create swirls. The shaping also causes slowing down the movement of the droplets of aqueous solution and thereby their collisions. The height of the roughening is in the region of 0.3-1.0 mm and/or the height of the shaping is in the region of 2-3 mm. The large drops formed fall downwards from the extraction solution due to the effect of gravity and combine on the bottom of the settling tank to form a layer of aqueous solution.

The aqueous solution that has already separated from the extraction solution is routed to flow onwards via guide channels located in the lower section of the droplet coalescer. In this way the aqueous solution does not get mixed into the extraction solution again. The guide channels are located above each other and pointed downwards in the direction of flow of the solution. The number of guide channels is $\frac{1}{5}$-$\frac{1}{3}$ of the number of flow channels.

In addition to flow channels, the settling tank may be equipped with at least one device that deflects the flow vertically upwards. Preferably the number of turning elements is the same as that of droplet coalescers and they are situated after the droplet coalescers when seen in the direction of flow. By means of the turning element, the direction of the flow of extraction solution is deflected at intervals from horizontal to vertical, which helps the droplets of aqueous solution to disengage into their own layer on the bottom of the tank. The turning element is situated at the same depth as the flow channel. The turning element allows the flow to be deflected across the entire width of the settling tank. As the organic solution and the scrubbing solution used to purify it are made to proceed in the settling tank from the feed end towards the rear end and as the solutions are made to flow in both horizontal and also vertical directions, the solutions are mixed together well. At the same time as the cross-section of the flow is reduced momentarily, small droplets of water are made to coalesce into large drops and the scrubbing effect of the scrubbing solution is increased.

In one embodiment of the invention the settling tank is also used for the chemical purification of extraction solution, especially when copper extraction is concerned. In this case it is mainly a question of iron removal by means of a scrubbing solution containing copper and sulphuric acid. According to the method, an aqueous solution exiting metal leaching, from which the valuable metal has largely been removed, is routed to a settling tank for extraction solution scrubbing. In order for the acid concentration and copper content to be suitable, an acid-containing electrolyte from electrolysis that will be routed to stripping can also be fed into the solution, known by the abbreviation LE (lean electrolyte). The scrubbing of the extraction solution can further be improved by circulating the aqueous solution from the rear end of the settler into the extraction solution to be purified. Further, in addition to the aqueous solution some of the extraction solution circulating in the settler, for example 5-35%, can be recirculated along with the aqueous solution. Some of the aqueous solution from the rear of the settling tank is routed at least occasionally to a suitable extraction stage mixer.

The pure organic extraction solution and the aqueous solution are removed from the rear end of the settler as several separate sub-streams.

The settling apparatus according to the invention comprises an essentially rectangular settling tank, which is made up of a feed end and a rear end, sidewalls and a bottom.

At least one feed pipe is arranged in the feed end of the settling tank, and said feed pipe is attached at one end to an organic extraction solution feed unit. The scrubbing solution is mainly fed into the extraction solution before it is fed into the settler. The feed pipe is equipped with several separate discharge elements evenly across the entire width of the tank, after which at least one droplet coalescer is situated in the settling tank when seen in the direction of flow.

The droplet coalescer is arranged to be essentially in an upright position and it extends from one side of the tank to the other. The device consists of several adjacent elements, which extend from the bottom of the tank to above the surface of the liquid. The elements are mainly solid, but their upper section is equipped with flow plates with a roughened and/or shaped surface, directed obliquely upwards from the direction of flow. Almost the whole solution stream is directed via the flow channels formed between the flow plates. The flow plates are located at a distance that corresponds to 10-25% of the height of the droplet coalescer.

In one embodiment of the invention the flow plates are profiled with the formation of rounded protrusions on the surface of the plate. The height of the rounded protrusions may be in the region of 2-3 mm. Preferably the lower surface of the plate is provided with protrusions and the upper surface is roughened, so that the lower surface of the actual flow channel is roughened and the upper surface provided with protrusions directed towards the flow channel. The roughening is in the region of 0.3-1 mm. Additionally, both surfaces of the plate may be roughened. Also, the whole plate may be made undulating.

Some guide plates are located in the lower section of the element. The layer of aqueous solution that has separated from the extraction solution is made to flow via the guide plates located in the lower section of the element. The number of guide plates is $\frac{1}{5}$-$\frac{1}{3}$ of that of the flow plates. The guide plates are like the flow plates in shape and are directed downwards.

In one embodiment of the invention the settling tank is provided after the droplet coalescer with solid turning elements that are essentially vertical, situated at the height of the flow plates. The height of the turning element is 1.5-2.5 times that of the flow plate cassette. The turning element changes the direction of the solution stream from horizontal to almost vertical and at the same time achieves the coalescence of the small droplets.

The rear end of the tank is equipped with at least one organic solution discharge pipe, one end of which is connected to the corresponding discharge unit. The discharge pipe in turn is equipped with several suction elements in order to remove the scrubbed organic solution evenly across the entire width of the tank.

One of the advantageous properties of the equipment is its function as an organic solution volume equalising tank for one extraction process unit. The tank also acts as a safety tank, in which organic solution can be stored in emergency situations, such as when there is a threat of fire or during malfunctions. In normal situations the feed filling degree is 50-65% of the total tank volume. The method and equipment according to the invention are intended for connection mainly to extraction processes operating horizontally, as opposed to columns.

The infeed of the solution into the settling tank takes place from a minimum of one feed unit into at least one feed pipe, known as the bypass manifold. The settling tank is preferably situated at a lower level than the extraction steps, so that the solution feed occurs beneficially by free flow. Pumping is undesirable at this stage, because it makes the water seepage droplets in the extraction solution decrease in size even further. The feed pipe is equipped with several discharge elements so that the volume flow of the solution entering the tank is divided evenly into several sub-streams. This avoids lateral flows and eddies that would disturb the free settling of the droplets. The discharge element may be either a pipe attached to the feed pipe or an opening in the feed pipe. The organic solution is fed below the surface of the liquid directing it diagonally downwards in the feed end into the aqueous layer in the bottom, whereby water coalescence occurs and a water contact surface is formed, to which the small water droplets to be removed can adhere. If required, the bottom of the tank at the feed end can be equipped with a well. Preferably, at least some of the aqueous solution for scrubbing the organic solution is fed into the organic solution before it is sent to the mixing tank.

In order for the extraction solution and the scrubbing solution to be dispersed into each other, the flow rate of the extraction solution sub-streams is between 0.7 and 1.5 m/s, preferably 0.9-1.2 m/s. The feed pipes are placed upwards from the bottom of the tank so that there is a clearance below them of $1/15$-$1/5$ of the depth of the tank. The downward-directed flow circulates first towards the feed end, before turning towards the rear end of the tank.

The settling equipment has a well at the solution discharge end, into which the aqueous layer that has separated from the organic solution and is moving against its lower surface accumulates. The aqueous solution is partially routed back to the front end of the tank, where it is fed again as droplets into the incoming solution. Some of the water may be fed if required before this into the scrubbing solution pipeline via suitable nozzles or freely above the surface.

The removal of small water droplets is thus based on several factors in this method. Before the settling tank, the aqueous stream to be fed into the pipeline is dispersed into the organic solution in drops that are considerably larger than the droplets to be removed. These drops together form a surface area onto which some of the small droplets can coalesce. When the stream has progressed to the feed end of the settling tank, by directing the organic layer, the aqueous layer at the bottom is made to disperse into drops again, which travel with the flow, settling towards the bottom and trapping other water droplets at the same time. The water drops moving in the solution to be scrubbed are forced to flow via the flow channels, forming a continuous film of water on their surface, a hydrophilic surface that provides the water droplets with a convenient adhesive base.

The scrubbed extraction solution is removed from the equipment by suction with a pump via at least one outlet pipe, which is the same type as the inlet pipe. The solution is thus sucked up evenly across the whole width of the tank via suction elements connected to the discharge pipe in several separate sub-streams, which ensures that the flow remains non-turbulent at the rear of the tank. The suction element may be a pipe connected to the outlet pipe or an opening in the outlet pipe. The suction elements are preferably directed obliquely upwards towards the rear end of the tank, so that the suction direction slants downwards from the solution surface, but nevertheless below the surface. In the same way, the aqueous solution (scrubbing solution) that has separated to the bottom of the tank is removed via at least one outlet pipe and the water suction elements connected to it in several separate sub-streams. The suction element may be a pipe connected to the water outlet pipe or an opening in the outlet pipe. The water suction elements are preferably directed obliquely towards the bottom, i.e. the water suction streams occur obliquely upwards from the bottom.

The chemical purification of the organic solution used in liquid-liquid extraction processes in a balancing tank to equalize the solution circuit is not restricted to any particular metal extraction process. The method and equipment described above are, however, highly suitable for example when the valuable substance to be recovered is copper. The same kind of acidic wash is suitable in most cases for the purification of an extraction solution loaded with metal. In sulphate-based processes, the oxidising acid used is sulphuric acid as one component of the scrubbing solution and the other component is generally the metal being extracted in the extraction process. When the final recovery of the metal in question occurs using the electrowinning principle, the electrolyte from electrowinning can be used to make the extraction process scrubbing solution. When for instance the metal to be extracted is copper, the electrolyte contains 30-60 g/l Cu and 150-200 g/l sulphuric acid. The electrolyte is added to pure water so that the sulphuric acid content of the scrubbing solution fed into the setter is in the range of 20-50 g/l.

The settling tank with fittings according to the invention, which hereafter for the sake of simplicity shall be referred to by the abbreviation LO tank, is preferably for utilization in an extraction process where the solution streams are large. The extractants used in the recovery of copper extract very little other metal apart from copper, so that an extraction solution is obtained that is almost pure enough in relation to copper. The careful removal of entrained water droplets combined with a certain chemical scrub often raises the purity of the extractants used enough for the subsequent process stage, i.e. electrolysis, nor is a separate scrubbing stage always necessary.

If, however, the extraction solution contains harmful substances to a greater extent, the extraction solution should be treated further in a separate mixer-settler type of scrubbing step. In copper extraction these harmful substances are iron, molybdenum and manganese. When the amount of impurities is such that in an ordinary configuration one scrubbing step is not enough, it is now advantageous to use the settling equipment according to this invention in addition to one scrubbing step in order to sufficient extraction solution purity. Thus the use of several scrubbing stages can be avoided. In some situations sufficient scrubbing can only be achieved with a large amount of scrubbing solution, which consumes water and increases the circulation of metal via scrubbing. For example, many large copper extraction facilities are located in dry wastelands where purified water is itself a significant cost factor. In addition, costs arise from copper circulation when the scrubbing water used is routed either back to the extraction stage or to the leaching that precedes it. In these kinds of situations the use of an LO tank improves the economy of the process.

LIST OF DRAWINGS

Figure 2:
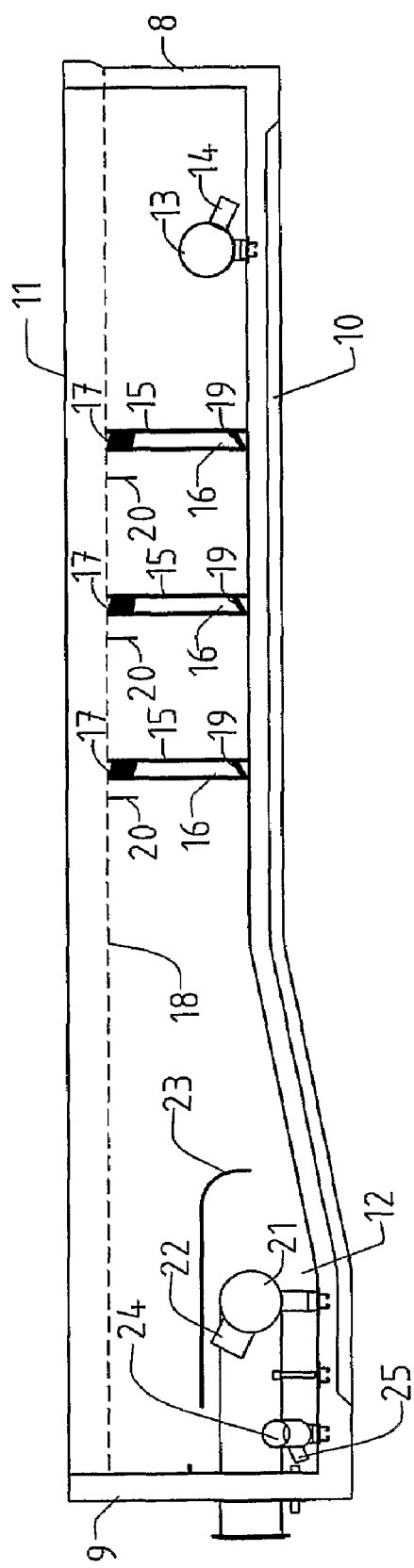
Figure 3:
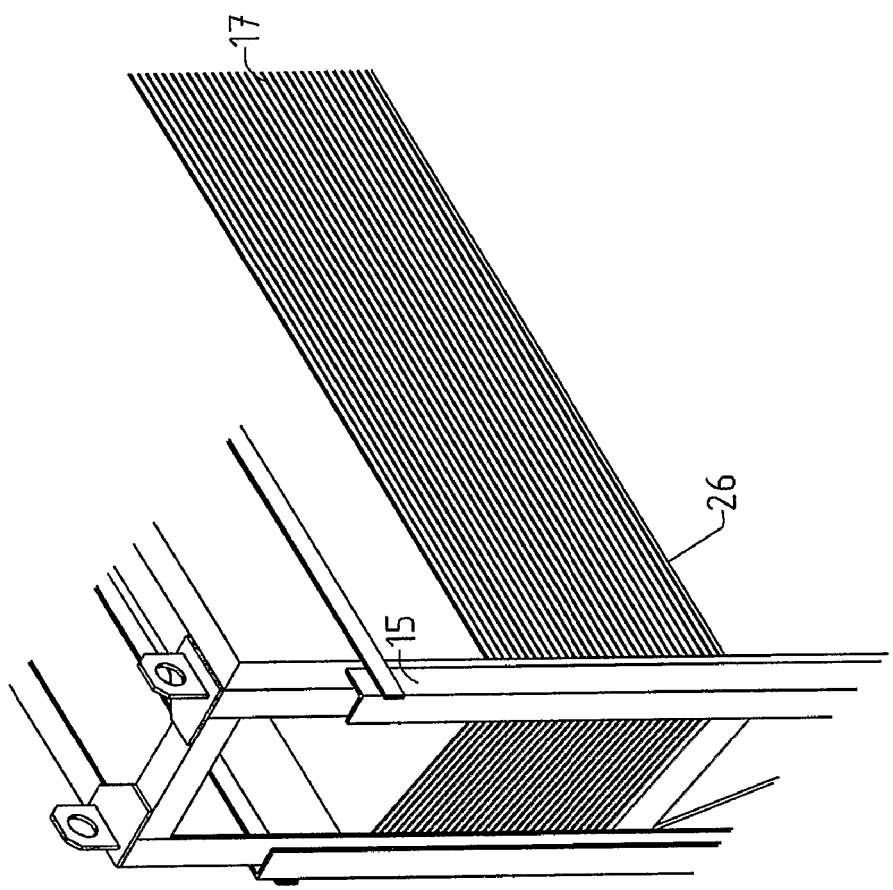
Figure 4A:
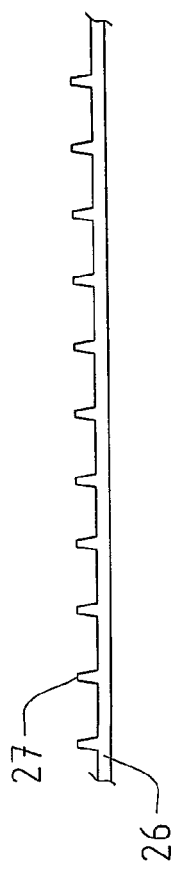
Figure 4B:
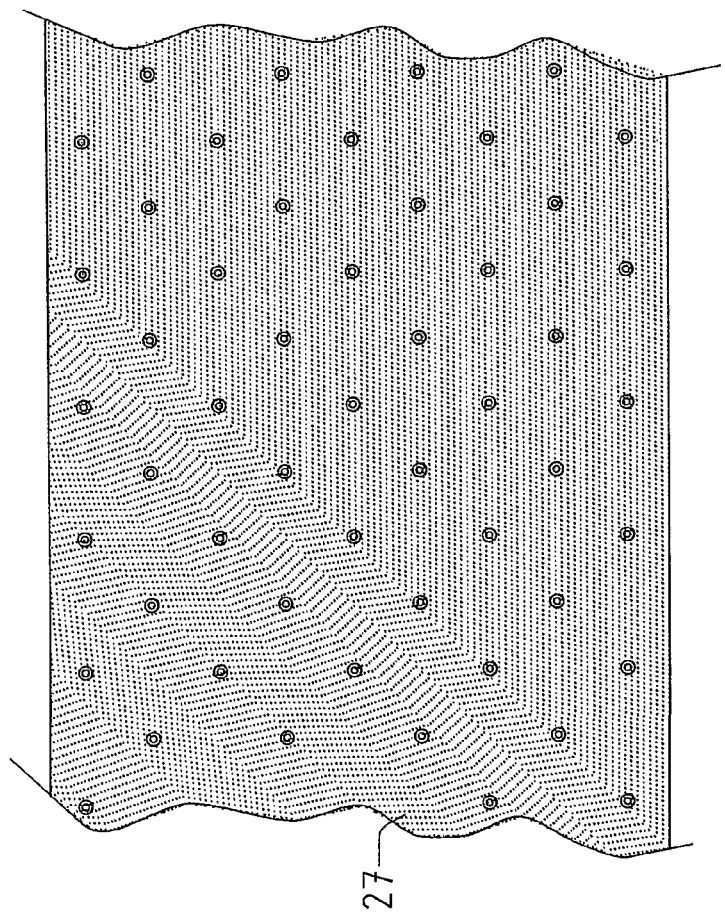

The apparatus according to the invention is further described by means of the appended drawings, in which FIG. 1 shows one extraction unit arrangement according to the invention seen from above, FIG. 2 presents a settling tank of the invention as a longitudinal cross-section, FIG. 3 shows flow plates of droplet coalescer seen as cut three-dimensional image, FIGS. 4A and 4B show the upper and lower surfaces of a flow plate according to the invention.

DETAILED DESCRIPTION OF THE INVENTION

FIG. 1 shows how an LO tank 1 i.e. an organic extraction solution settling and scrubbing tank according to the invention is connected to the rest of the extraction process. The extraction process in the diagram includes extraction steps E1, E2 and E3, an LO tank, one washing stage W and a stripping step S. The extraction solution containing a valuable substance is brought to the tank via piping 2 for instance from extraction step E1. The settled and scrubbed extraction solution is routed out of the tank along line 3 either to washing step W or directly to stripping S. As mentioned above, the actual washing step can be omitted if the amount of impurities in the organic solution is small.

When the settling tank is also used for chemical scrubbing of the extraction solution, aqueous solution 4 is brought to extraction step E1 as the scrubbing liquid in the embodiment shown in this diagram. The acid and metal such as copper required for chemical scrubbing are brought to the tank in the form of lean electrolyte (LE) along line 5. Internal circulation from the rear end of the tank to the front end occurs through line 6. When the aqueous solution is removed completely from the tank into the extraction solution circulation, it occurs through line 7 and it is routed for example to extraction step E2.

FIG. 2 shows one LO tank 1 according to the invention in more detail. The feed end 8 and rear end 9, bottom 10 and upper edge 11 of the tank are shown. In the bottom of tank 1 there is an additional well 12 at the rear end for the separated aqueous layer. The depth of the additional well in the rear end is in the range of ⅙-⅓ of that of the rest of the tank. The organic solution is fed into one or several feed pipes 13 situated in the feed end of the tank via a feed unit(s) 2, the number of which depends on the amount of organic solution. Each feed pipe is equipped with several discharge elements, which in this case are discharge pipes 14. The discharge pipes are preferably directed obliquely downwards.

The size of the water droplets in the LO tank is made to grow especially by means of the droplet coalescer 15, of which there is at least one. In the tank in FIG. 2 there are three devices, and this can be varied according to need between 1 and 5. Each device 15 extends from one side of the settling tank to the other and in practice is made up of several cassettes placed side by side. The length of the device in the direction of flow is 0.1-1 m, preferably 0.3-0.7 m. The device is solid in the middle 16 and the flow plate cassette 17 that actually increases the droplet size is located in the upper section of the device. Each cassette is made up of several flow plates placed on top of 15 each other, between which flow channels are formed. The droplet coalescer forms a dense flow barrier in the tank, so that the entire flow of extraction solution takes place via the flow channels. The flow plates are positioned at a distance from each other of 2-6 mm in elevation, preferably 3-5 mm. The flow plates are angled obliquely upwards in the direction of flow at an angle of 5-30 degrees, preferably at 10-20 degrees to the horizontal.

The number of flow channels and flow plates is chosen so that the flow in the channels is largely laminar. When the viscosity of the extraction solution is for instance in the range of 1.5-7 cP, it is preferable to keep the flow rate around 0.08-0.20 m/s, preferably between 0.12-0.17 m/s.

The droplet coalescer extends vertically above the surface of the liquid 18 in the settler. Situated in the lower section of the device, near the bottom, there are several guide plates forming a connecting channel cassette 19, via which the enriched aqueous solution in the bottom layer is made to move forwards in the tank evenly. The guide plates forming the connecting channel are in principle the same type as the flow plates in the upper section of the device.

The connecting channel plates, however, when seen in the direction of flow, are inclined downwards at an angle of 10-45 degrees, preferably 25-35 degrees. The number of connecting channel guide plates is far smaller than that of the flow plates, so that there are ⅕-⅓ of the number of flow plates.

The surfaces of both the flow plates and the guide plates are roughened or otherwise shaped so that there is a roughening of around 0.3-1.0 mm in height in their surface and/or a 2-3 mm high profile. In particular, the upper surface of the flow plate, that is, the surface that forms the lower surface of the flow channel, is preferably shaped so that it causes a slight mixing motion. The movement of the droplets of aqueous solution that are slowly separating downwards is slowed by the effect of the shaped surface and they stick partially to the shaped surface, particularly if it is roughened. The droplets collide with each other on such surfaces and combine into bigger drops. As the size of the drops increases, the flow detaches the drops and on exiting the flow channels, they have grown to such a size that they settle to the bottom of the tank.

The settler can further be equipped with a turning element 20 located after the droplet coalescer. The turning element extends from one side of the tank to the other and is essentially vertical and solid. It is located in relation to the droplet coalescers so that it is much nearer to the previous coalescer in the direction of flow than to the following one. The upper edge of the turning element is located at the same height as the droplet coalescer flow plate cassette and its height is 1.5-2.5 times the height of the flow plate cassette. The height of the turning element may also be reduced in the direction of flow. The number of turning elements is preferably the same as the number of droplet coalescers.

The droplet coalescer devices are grouped in the settler so that the share of the feed space before the first device is 15-25% of the length of the tank and the share of the rear space after the last device 25-40%.

The scrubbed organic solution in the rear end 9 of the tank is recovered via one or several organic solution outlet pipes 21, which are in turn connected to a corresponding outlet unit 3. The scrubbed organic solution is sucked out evenly into the outlet pipes from across the entire cross-section by means of suction pipes 22. The outlet pipes and their suction pipes are arranged in the same way as the feed pipes and discharge pipes, that is, a certain part of the solution to be removed is sucked up via each outlet pipe. The outlet pipes are situated in the well 12 in the bottom of the tank, but inside the organic solution. The suction pipes 22 may be advantageously slanted upwards towards the rear end 9. In the description of the invention we talk of discharge pipes and suction pipes but in principle these elements could also be openings in the feed and outlet pipes.

In one application of the invention, the protective structure 23 shown in the diagram is arranged on top of the outlet pipes, comprised of an essentially horizontally curving plate placed on top of the outlet pipes. The front edge of the plate is placed in front of the first outlet pipe in the direction of flow. The rear end of the plate extends a little closer to the rear end of the tank than the furthermost outlet pipe. The protective structure arranged on top of the outlet pipes helps ensure that only the scrubbed organic solution flowing in the upper section of the LO tank that has circulated in the vicinity of its rear end is sucked out of the tank and into the following stage. The number of LO tank feed and outlet units is determined by the amount of solution to be fed into the tank.

The feed pipe or pipes 13 are preferably located so that they do not actually touch the feed end 8 of the LO tank, but stop a little short of it. The discharge pipes 14 of the feed pipe are correspondingly preferably slanted downwards towards the feed end. As a result of this, a circulation flow of solution occurs around the feed pipe. The length of the discharge pipe is preferably at least twice the diameter of the pipe, so that the discharge jets can be directed obliquely downwards towards the aqueous layer forming on the bottom.

The aqueous solution that has accumulated in the well 12 is removed in exactly the same way via one or several outlet pipes 24, which are also equipped with their own suction elements 25. The aqueous suction pipes are preferably slanted downwards. The suction pipes may also be directed to the rear end of the tank. The aqueous outlet pipe and suction pipes are also arranged in the same way as the feed pipes and their discharge pipes, i.e. if the number of outlet pipes is more than one, a certain part of the solution to be removed is sucked up via each outlet pipe.

It is preferable to remove more solution via the aqueous solution suction line than the amount separated from or fed into the extraction solution, since in this way the purity of the organic solution is ensured in relation to aqueous entrainment. In this way some extraction solution from the lower section of the extraction solution layer is also sucked up along with the aqueous solution.

When the scrubbing solution is routed to the LO tank directly, it is preferable to do this by spreading the coalesced scrubbing solution into the organic solution at the point of the droplet coalescers.

FIG. 3 shows a partially cut three-dimensional view of the flow plate cassette 17 composed of the flow plates 26 of the droplet coalescer device 15.

FIGS. 4A and 4B show the upper and lower surfaces of a flow plate of one droplet coalescer device. In FIG. 4A, protrusions 27 have been formed on the surface of flow plate 26 at regular intervals, which deflect the flow and help the small droplets to combine with each other. The protrusions in the drawing are circular, which achieves a smooth flow. Preferably the protrusions cover 10-50% of the surface of the plate. According to one embodiment, the surface of the plate is also slightly undulating, which achieves a vertical change in direction for the advancing streams. FIG. 4B shows the roughened surface of one flow plate, of which the beneficial effects are described above.

The invention is not restricted only to the embodiments presented above but modifications and combinations of them are possible within the framework of the concept of the invention included in the patent claims.

The invention claimed is:

1. A method for scrubbing aqueous entrainment, or impurities, or both from an organic extraction solution that:
   is obtained from a liquid-liquid extraction during hydrometallurgical recovery of metals;
   contains a valuable metal or substance that has been introduced into it during the liquid-liquid extraction;
   is slightly soluble in aqueous solutions;
   the method comprising:
   introducing the organic extraction solution into a settling tank comprising:
      a front end;
      a rear end; and
      at least one vertically extending droplet coalescer extending across the settling tank at at least one point, the droplet coalescer comprising:
         a flow channel zone that is located in an upper section of the droplet coalescer, and comprising a plurality of overlapping flow channels inclined obliquely upwards in the direction of flow and having surfaces that are roughened, shaped to cause swirling, or both;
         a solid center portion; and
         a guide channel portion located in the lower section of the droplet coalescer, comprising a plurality of overlapping guide channels inclined obliquely downwards in the direction of flow;
      wherein the number of guide channels in the guide channel zone of the droplet coalescer is ⅙ to ⅓ of the number of flow channels in the flow channel zone of the droplet coalescer;
   flowing the organic solution from the front end of the settling tank toward the rear end of the settling tank, and through the flow channel zone;
   coalescing in the flow channel zone aqueous entrainment in the organic extraction solution into droplets sufficiently large to settle to the bottom of the settling tank to form a separated aqueous solution;
   flowing the separated aqueous solution through the guide channels in the lower section of the coalescer; and
   removing scrubbed organic extraction solution and separated aqueous solution from the settling tank in separate streams.

2. A method according to claim 1, wherein the introducing of the organic extraction solution to the settling tank comprises discharging the organic extraction solution into the settling tank evenly in several separate sub-streams across the entire width of the tank; wherein the droplet coalescer forms a dense flow barrier in the tank, thereby reducing the horizontal cross-section of flow in the tank, so that the horizontal flow of the extraction solution takes place via the flow channel zone and the guide zone; wherein the direction of flow of the extraction solution is deflected vertically by a turning element disposed after the droplet coalescer in the direction of horizontal flow; and wherein the removing of the scrubbed organic extraction solution and the separated aqueous solution comprises removing each from the rear end of the settling tank in several sub-streams.

3. A method according to claim 1, further comprising combining an acidic aqueous scrubbing solution with the organic extraction solution before introducing the organic extraction solution into the settling tank.

4. A method according to claim 2, wherein the introducing of the organic extraction solution to the settling tank further comprises feeding the organic extraction solution into the settling tank below the liquid surface, and wherein the separate sub-streams are directed obliquely downwards in the direction of flow.

5. A method according to claim 1, wherein the flow channel zone has a cross-sectional area that is 10-25% of a cross-sectional area of the tank measured from the bottom up to the liquid level.

6. A method according to claim 1, wherein the flow channel zone comprises several overlapping flow channels, of a height of around 2-6 mm.

7. A method according to claim 6, wherein the height of the roughening is in the range of 0.3-1 mm and/or the height of the shaped profile is in the range of 2-3 mm.

8. A method according to claim 1, wherein the settling tank contains 1-5 droplet coalescers.

9. A method according to claim 1, wherein the removing of the scrubbed extraction solution from the settling tank comprises non-turbulent flow in an obliquely downward direction from the surface at the rear end of the settler tank in several sub-streams.

10. A method according to claim 1, wherein the removing of the aqueous solution comprises flow from the rear end of the settler tank obliquely upwards from the bottom in several sub-streams.

11. An apparatus for scrubbing aqueous entrainment, or impurities, or both, from an organic extraction solution that:
   is slightly soluble in aqueous solutions;
   is obtained from a liquid-liquid extraction during hydrometallurgical recovery of metals;
   contains a valuable metal or substance that has been introduced into it during the liquid-liquid extraction;
   said apparatus comprising:
   an essentially rectangular-shaped settling tank, comprising:
      a feed end;
      a rear end;
      sides;
      a bottom;
   at least one organic solution feed connection at the feed end of the settling tank;
   at least one organic extraction solution removal connection at the rear end of the settling tank;
   at least one droplet coalescer extending from one side of the tank to the other and from the bottom of the tank to above the surface of the liquid, comprising:
      a solid center section;
      an upper section comprising a flow plate cassette containing a plurality of overlapping flow plates which have roughened and/or shaped surfaces for the flow of organic extraction solution and which are obliquely directed upwards in the direction of flow; and
      a lower section comprising a connecting channel cassette containing a plurality of overlapping guide plates inclined obliquely downwards in the direction of flow of aqueous solution
      wherein the guide plates define a plurality of guide channels and the flow plates define a plurality of flow channels, such that the number of guide channels is ⅙ to ⅓ of the number of flow channels.

12. An apparatus according to claim 11, further comprising:
   at least one feed pipe arranged at the feed end of the settling tank, connected at an end of the feed pipe to an organic extraction solution feed unit and equipped with several separate discharge elements evenly distributed across the entire width of the tank;
   at least one scrubbed organic extraction solution outlet pipe arranged at the rear end of the settling tank, connected at one end of the outlet pipe to a corresponding outlet unit, and equipped with several suction elements adapted to remove the scrubbed organic extraction solution evenly across the entire width of the tank;
   a well formed in the bottom at the rear of the tank, adapted to collect aqueous solution provided by the droplet coalescer, and equipped with at least one aqueous solution outlet pipe, wherein said outlet pipe has several suction elements adapted to remove the aqueous solution evenly across the entire width of the tank.

13. An apparatus according to claim 11, wherein the flow plates are directed obliquely upwards at an angle of 5-30 degrees.

14. An apparatus according to claim 11, wherein the flow plates are spaced apart from each other a distance of 2-6 mm and the guide plates are spaced apart from each other a distance of 2-6 mm.

15. An apparatus according to claim 11, wherein the guide plates are directed obliquely downwards in the direction of flow at an angle of 10-45 degrees.

16. An apparatus according to claim 11, wherein the flow plates, or guide plates, or both, have a surface roughness in the range of 0.3-1 mm, are otherwise shaped to have a height of 2-3 mm from the plate surface.

17. An apparatus according to claim 11, wherein the surfaces of the flow and guide plates have an undulating profile.

18. An apparatus according to claim 16, wherein the flow plates or the guide plates or both contain rounded protrusions on a lower surface thereof and surface roughness on an upper surface thereof.

19. An apparatus according to claim 11, wherein the number of droplet coalescers in the settling tank is between 1 and 5.

20. An apparatus according to claim 11, wherein the settling tank further comprises at least one essentially vertical solid turning element, situated downstream of the droplet coalescer when seen in the direction of flow, having an upper edge located at the same height as the flow plate cassette, extending a vertical distance that is 1.5-2.5 times that of the flow plate cassette, and extending from one side of the tank to the other.

21. An apparatus according to claim 11, wherein the tank has sufficient volume that it can be used as a equalising tank.

22. An apparatus according to claim 11, further comprising several feed pipes, each having discharge elements arranged to feed the organic extraction solution into a different sub-section of the tank width, wherein the number of such sub-sections is the same as the number of feed pipes.

23. An apparatus according to claim 11, further comprising a feed pipe having discharge elements directed obliquely downwards towards the feed end of the tank.

24. An apparatus according to claim 11, further comprising several outlet pipes for the scrubbed organic extraction solution having suction elements arranged to suck the scrubbed organic extraction solution from a separate sub-section of the tank width, wherein the number of such sub-sections is the same as the number of outlet pipes.

25. An apparatus according to claim 13, wherein the angle is 10-20 degrees.

26. An apparatus according to claim 15, wherein the angle is 25-35 degrees.

* * * * *